Patented Aug. 23, 1949

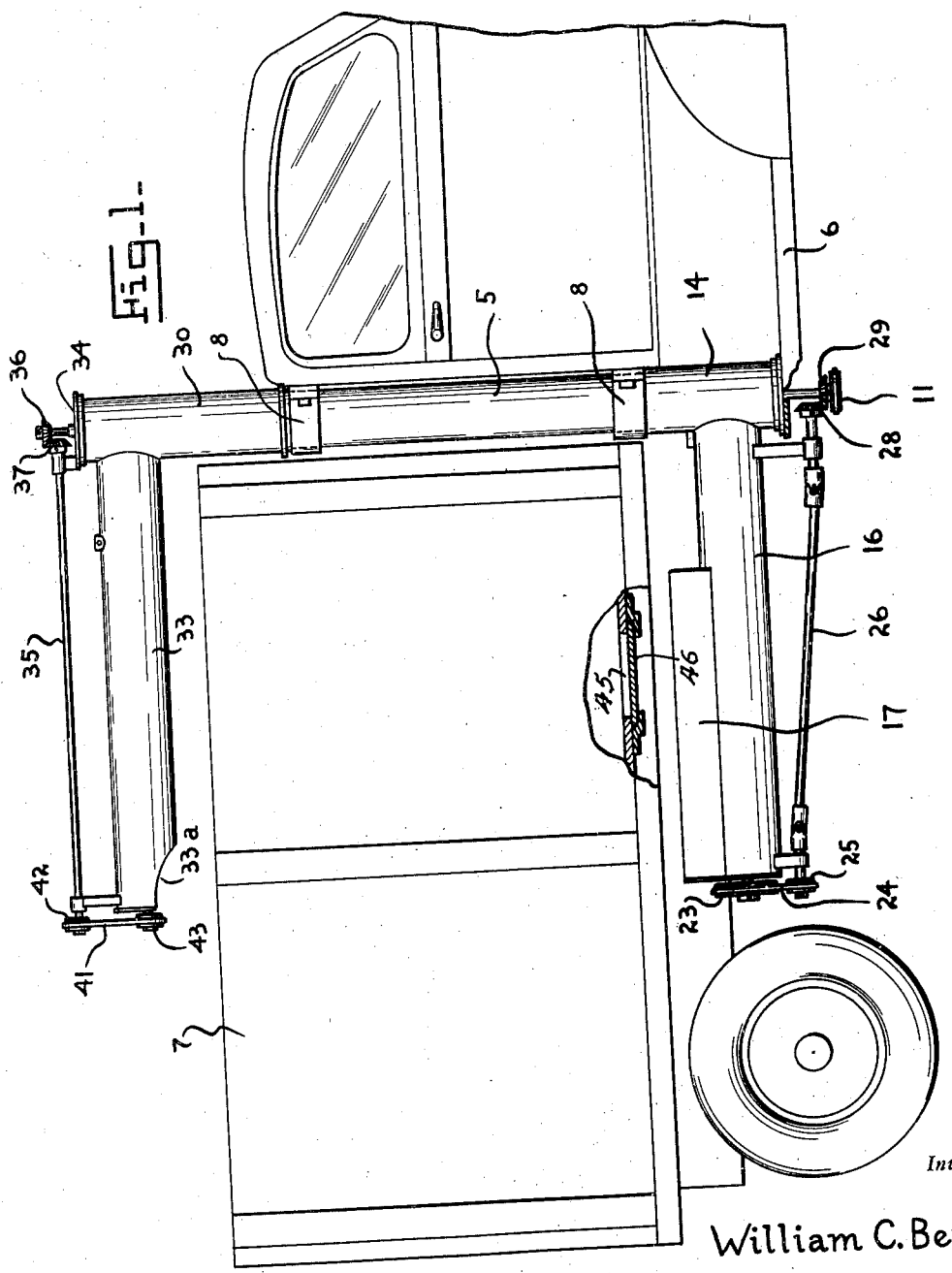

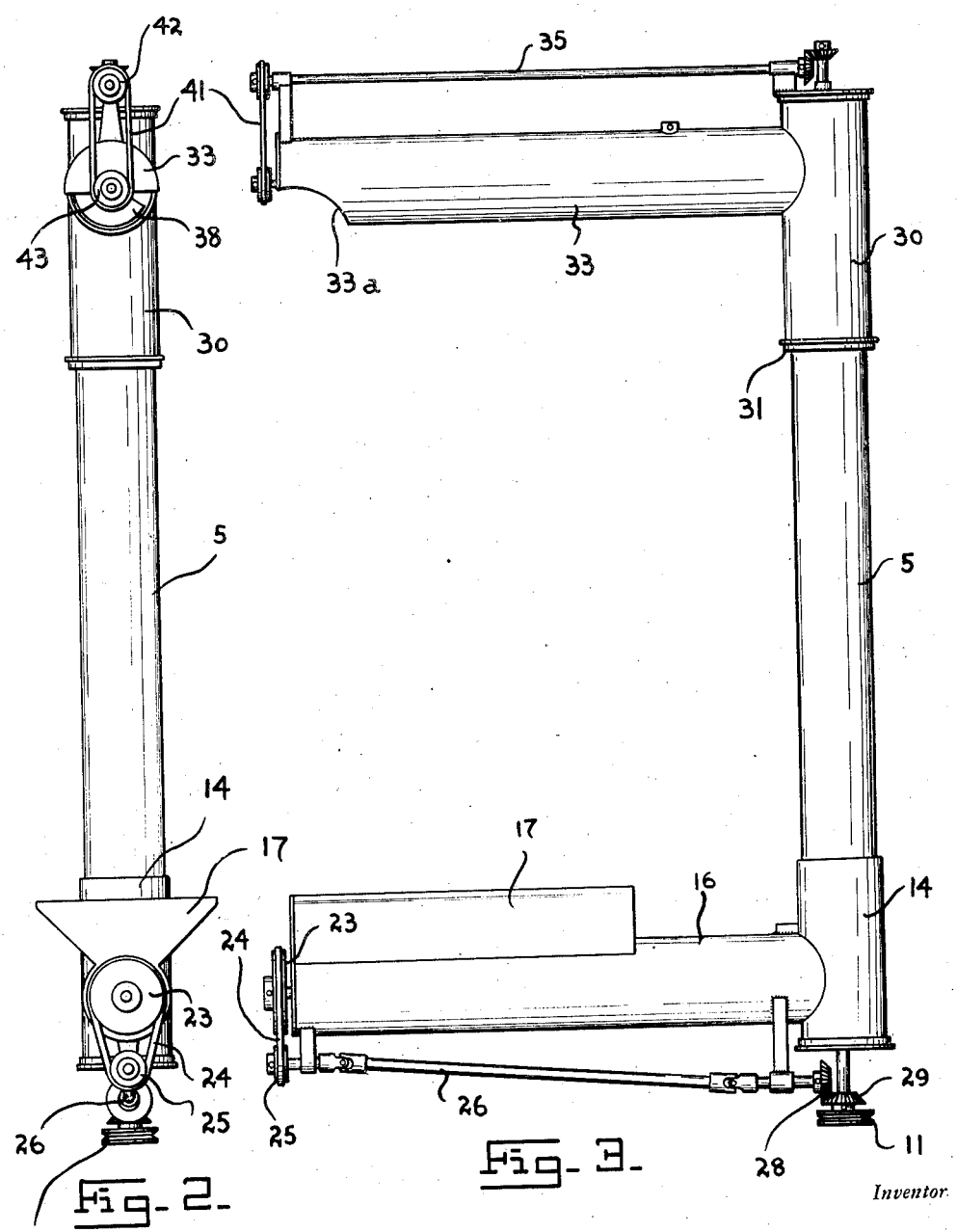

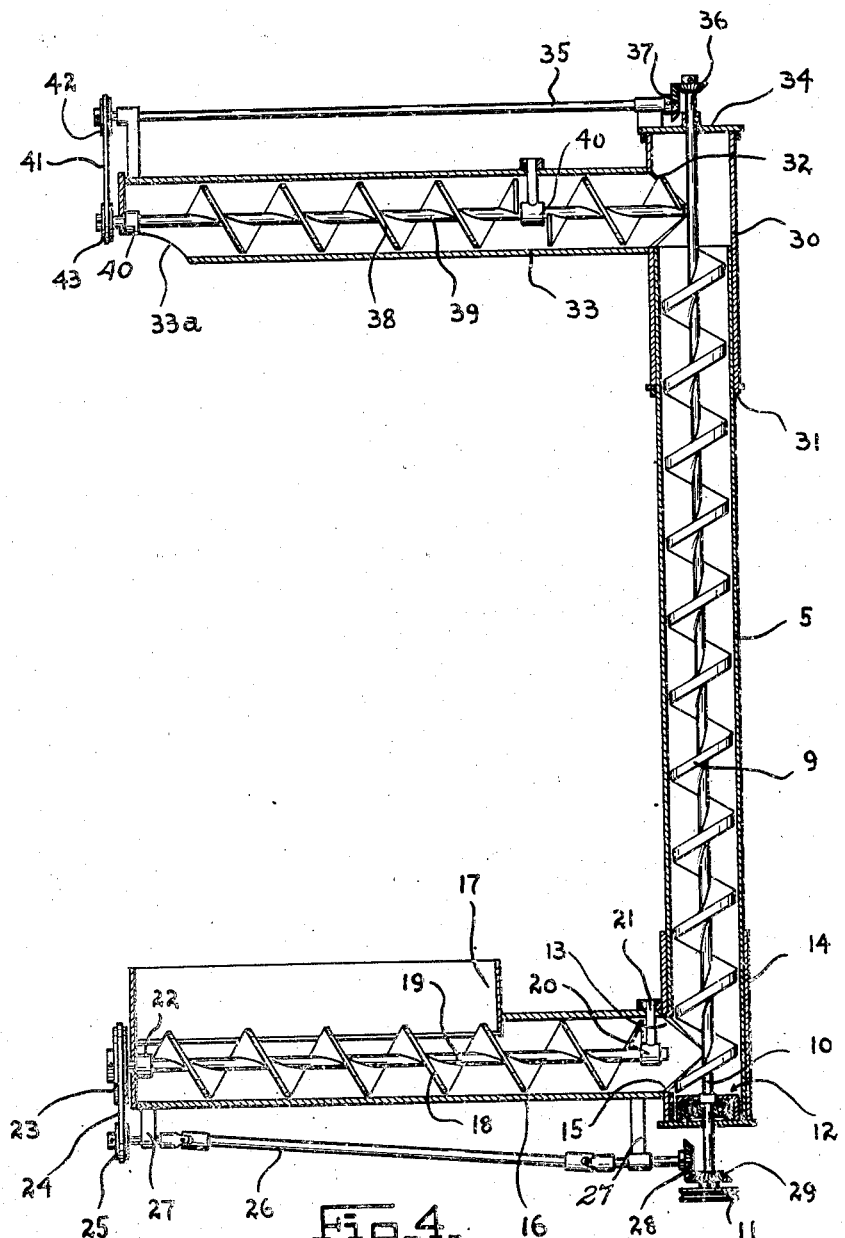

2,479,899

UNITED STATES PATENT OFFICE 2,479,899

TRUCK LOADER AND UNLOADER

William C. Beyer, Valley City, N. Dak.

Application August 31, 1945, Serial No. 613,782

1 Claim. (Cl. 214—83.32)

The present invention relates to new and useful improvements in loading and unloading devices, and more particularly to a device of this character by means of which grain or similar loose material may be loaded into a truck or other vehicle and also embodying means by which the material may be unloaded from the truck into a storage bin.

An important object of the present invention is to provide a loading and unloading device of this character including a conveyor operable from the power takeoff of the truck to provide an operative connection for either loading or unloading the truck.

A still further object of the invention is to provide an apparatus of this character of simple and practical construction which is efficient and reliable in operation, relatively inexpensive to manufacture and install in operative position on a truck without necessitating any changes or alterations therein, and which otherwise is well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a fragmentary side elevational view of a truck showing the loading and unloading elevator attached thereto, Figure 2 is an end elevational view of the elevator removed from the truck, Figure 3 is a side elevational view thereof, and Figure 4 is a longitudinal sectional view.

Referring to the drawings, in detail, wherein, for the purpose of illustration, I have disclosed a preferred embodiment of the invention, the numeral 5 designates a vertical conveyor tube adapted for supporting at its lower end on the running board 6 at either side of a grain box 7 of a conventional form of motor-driven truck having a power take-off (not shown) under the grain box at the center of the truck. The tube 5 is also supported in an upright position at the front end of the grain box by means of a clamping collar or the like 8 attached to the grain box.

Operatively mounted in the tube 5 is a screw or auger type conveyor 9 having its shaft 10 extending above and below the tube 5.

To the lower end of the shaft 10 is attached a pulley 11 or similar conventional drive means for operatively connecting the shaft with the power takeoff of the truck. The lower end of the shaft 10 is journaled in a bearing assembly 12 in the bottom of the tube.

An opening 13 is formed in the lower portion of the tube 5, the opening extending at least half way of the circumference of the tube, and rotatably mounted on the lower end of the tube is a sleeve 14 also having an opening 15 in one side thereof registering with the opening 13.

A horizontal tube 16 is welded or otherwise suitably secured to the side of the sleeve 14 at the opening thereof, the tube 16 being adapted to project outwardly at one side of the truck, or to swing inwardly under the grain box 7 of the truck, as shown in Figure 1 of the drawing.

The top of the tube 16 is formed with a longitudinally extending hopper 17 and operatively mounted in the tube 16 is a screw or auger type conveyor 18.

The conveyor 18 includes a shaft 19 journaled at its inner end in a bearing 20 supported by a hanger 21 from the top of the tube 16 and the outer end of the shaft 19 is journaled in a bearing 22 in the outer end of said tube.

A pulley 23 is secured to the outer end of the shaft 19 and is driven by a belt 24 from a pulley 25 on the outer end of a shaft 26 journaled in bearing brackets 27 supported at the underside of the tube 16.

A bevel gear 28 is secured to the inner end of the shaft 26 and is operatively engaged with a similar gear 29 secured on the lower end of the shaft 10 to thus also provide a driving connection for the conveyor 18 from the power take-off of the truck.

An upper sleeve 30 is rotatably mounted on the upper end of the tube 5 and projects upwardly above said tube, the lower end of the sleeve being supported on a ring 31 welded or otherwise secured to the tube. The sleeve 30 is also formed with an opening 32 in one side thereof communicating with an upper horizontal tube 33 welded or otherwise secured to the side of the sleeve 30.

The upper end of the sleeve 30 is closed by a cover plate 34 through which the upper end of the shaft 10 projects for operating an upper horizontal shaft 35 by means of the gears 36 and 37.

A screw or auger type conveyor 38 is operatively mounted in the upper tube 33 and includes a shaft 39 journaled in bearings 40, the outer end of the shaft 39 being driven from the shaft 35 by means of a belt 41 and pulleys 42 and 43.

In the operation of the device, when loading the grain box 7 of the truck, the tube 16 with the hopper 17 is swung outwardly at one side of the truck for depositing grain or other loose material therein, which is then elevated by the conveyor 9 in the tube 5 and outwardly through the upper horizontal tube 33 into the box 7.

When unloading the truck, the hopper 17 is swung into a position under the grain box 7 and the upper tube 33 is swung outwardly at the side of the truck with its discharge opening 33a overlying a storage bin (not shown). The grain box 7 is provided with a discharge opening 45 in its bottom having a sliding door 46 operative to open the same whereby grain is deposited into the hopper 17 from the box for elevating into the bin.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claim.

Having thus described the invention, what is claimed is:

The combination with a truck body having a bottom opening for discharging material therefrom, of a vertical conveyor including an upright tube mounted on said body and having an elevating spiral blade therein with upper and lower shaft ends, a lower horizontal conveyor for feeding material to the lower end of said vertical conveyor and including a hopper carrying tube with a spiral conveyor blade therein, an upper horizontal conveyor for discharging material from the upper end of said vertical conveyor including a tube with a spiral blade therein, an underslung drive between said lower shaft end and one end of the spiral blade of the lower conveyor, and an overhead drive between said upper shaft end and one end of the spiral blade of the upper conveyor, said lower conveyor being swingably mounted on said upright tube for positioning selectively under said opening to unload said body and to one side of said body for loading the same, said upper conveyor being swingably mounted on said upright tube for positioning selectively to discharge at one side of said body in the unloading position of the lower conveyor and into said body in the loading position of said lower conveyor.

WILLIAM C. BEYER.

REFERENCES CITED

The following references are of record in the file of this patent:

UNITED STATES PATENTS

| Number | Name | Date |
| --- | --- | --- |
| 1,475,361 | Stogdale | Nov. 27, 1923 |
| 1,781,240 | Molins | Nov. 11, 1930 |
| 1,785,604 | Tellefsen | Dec. 16, 1930 |
| 1,867,245 | Bailey | July 12, 1932 |
| 1,906,395 | Meeks | May 2, 1933 |
| 2,147,992 | Schau | Feb. 21, 1939 |
| 2,290,039 | Ford | July 14, 1942 |
| 2,300,017 | Shaffer | Oct. 27, 1942 |